United States Patent [19]
Lesser

[11] Patent Number: 6,007,853
[45] Date of Patent: Dec. 28, 1999

[54] DISPOSABLE BEVERAGE INFUSER

[75] Inventor: Brian J. Lesser, Brighton, Mass.

[73] Assignee: DBF, Inc., Brighton, Mass.

[21] Appl. No.: 09/264,112

[22] Filed: Mar. 8, 1999

Related U.S. Application Data

[63] Continuation-in-part of application No. 09/036,048, Mar. 6, 1998.
[60] Provisional application No. 60/040,096, Mar. 7, 1997.

[51] Int. Cl.⁶ .............................. B65B 29/02; A47J 31/00
[52] U.S. Cl. .............................. 426/77; 426/86; 426/433; 426/435; 426/594; 426/597; 99/279; 99/295; 206/0.5; 220/23.86
[58] Field of Search ................................. 426/77, 78, 82, 426/86, 433, 594, 597, 435; 99/279, 295, 304, 306, 322, 323, 323.3; 206/0.5; 220/23.86

[56] References Cited

U.S. PATENT DOCUMENTS

| | | | |
|---|---|---|---|
| 370,141 | 9/1887 | Hobbs | 99/304 |
| 494,607 | 4/1893 | Van Buskirk et al. | 99/304 |
| 643,349 | 2/1900 | Humphrey . | |
| 673,371 | 4/1901 | Thorp | 99/304 |
| 1,165,480 | 12/1915 | Wood | 99/304 |
| 1,462,610 | 7/1923 | Meyer | 99/322 |
| 1,777,909 | 10/1930 | Brookes | 99/322 |
| 2,157,656 | 5/1939 | Doble | 99/77.1 |
| 2,187,417 | 1/1940 | Doble | 99/77.1 |
| 2,728,672 | 12/1955 | Young et al. | 99/77.1 |
| 3,579,351 | 5/1971 | Wege et al. | 99/77.1 |
| 3,617,311 | 11/1971 | Betle et al. | 99/171 M |
| 3,767,420 | 10/1973 | Kim | 426/77 |
| 3,899,599 | 8/1975 | Rambold | 426/82 |
| 3,985,069 | 10/1976 | Cavalluzzi | 99/295 |
| 4,069,751 | 1/1978 | Gronwick et al. | 99/306 |
| 4,136,202 | 1/1979 | Favre | 426/77 |
| 4,158,329 | 6/1979 | McKnight | 99/295 |
| 4,229,481 | 10/1980 | Fornari | 426/77 |
| 4,520,716 | 6/1985 | Hayes | 99/306 |
| 4,619,830 | 10/1986 | Napier | 426/82 |
| 4,821,630 | 4/1989 | Roberts | 99/323 |
| 4,859,337 | 8/1989 | Woltermann | 210/474 |
| 4,948,601 | 8/1990 | Serbu | 426/82 |
| 4,981,588 | 1/1991 | Poulallion | 210/474 |
| 5,125,327 | 6/1992 | Winnington-Ingram | 99/306 |
| 5,147,540 | 9/1992 | Hagan | 210/232 |
| 5,171,457 | 12/1992 | Acuff et al. | 210/800 |
| 5,318,786 | 6/1994 | Clarkson | 426/79 |
| 5,363,745 | 11/1994 | Lin | 99/306 |
| 5,424,083 | 6/1995 | Lozito | 426/82 |
| 5,552,164 | 9/1996 | Kuipers et al. | 426/80 |
| 5,736,042 | 4/1998 | Aoki | 210/474 |
| 5,775,205 | 7/1998 | Melton | 99/322 |

OTHER PUBLICATIONS

Tea & Coffee Trade Journal, updated p. 76.
Tea & Coffee Trade Journal, updated p. 70.

*Primary Examiner*—Milton Cano
*Attorney, Agent, or Firm*—David S. Resnick; Nixon Peabody, LLP

[57] ABSTRACT

This invention relates to a disposable system for making portions of a hot beverage such as coffee or tea, comprising a porous filter designed to extend within a beverage container and having an upper region which is detachably coupled to the edge of the beverage container, whereby a predetermined quantity of solid beverage material can be placed within the filter, a predetermined quantity of liquid can be poured onto the beverage material, and the resulting liquid in the beverage container can steep with the solid beverage material within the filter, so that a desired portion of a beverage of a desired strength may be produced.

4 Claims, 7 Drawing Sheets

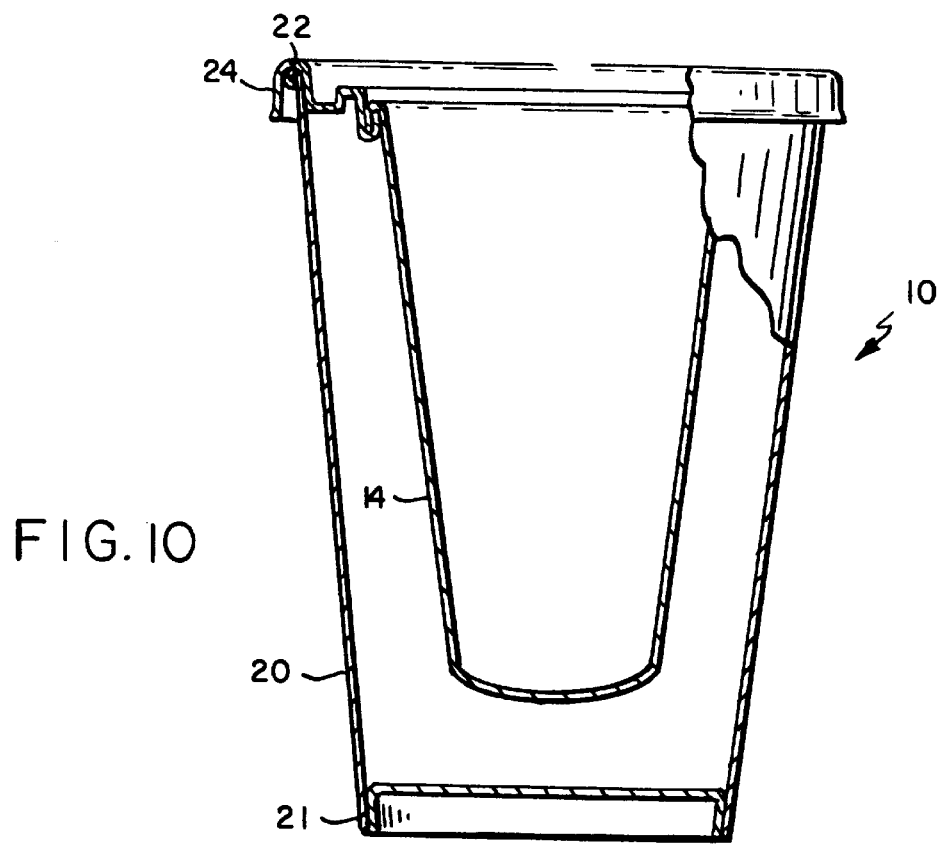
FIG. 10
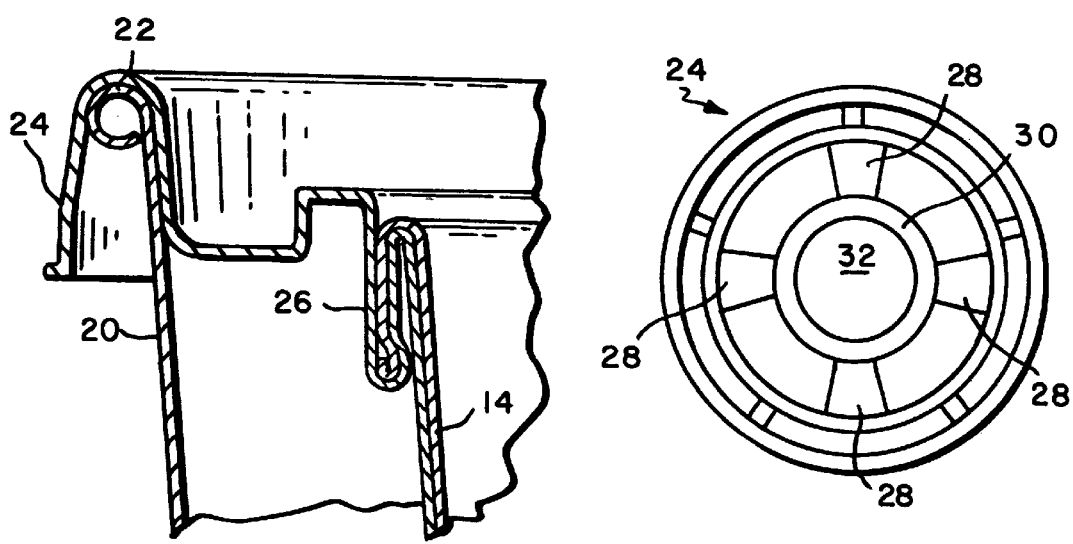
FIG. 11
FIG. 12

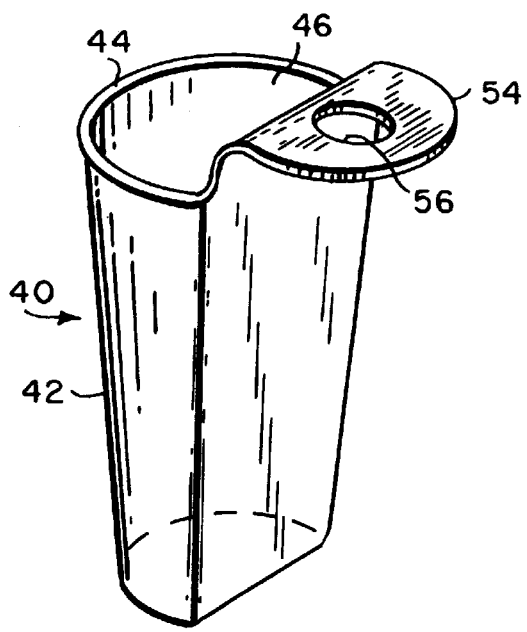
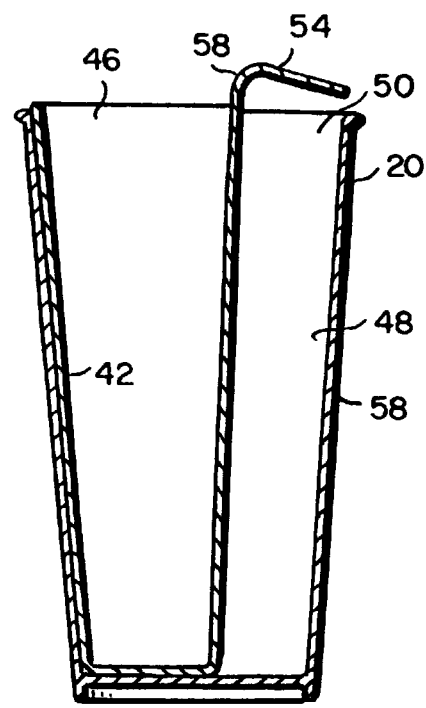
FIG. 15
FIG. 16
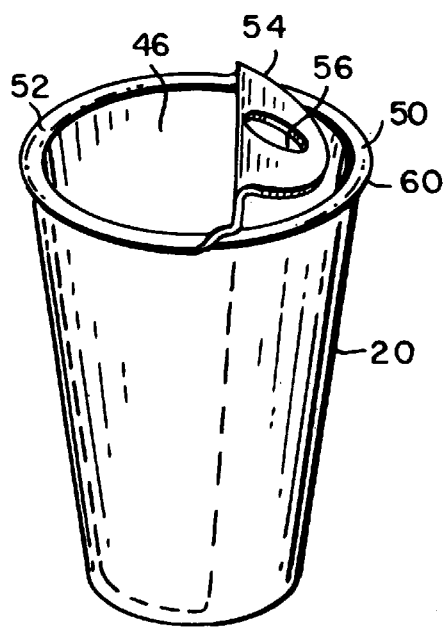
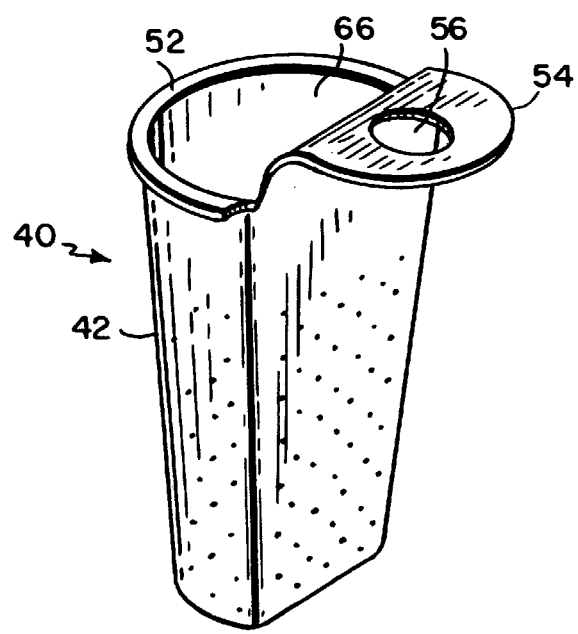
FIG. 17
FIG. 18

DISPOSABLE BEVERAGE INFUSER

CROSS REFERENCED TO RELATED APPLICATIONS

This application is a continuation-in-part of application Ser. No. 09/036,048, filed on Mar. 6, 1998, now pending, which claims the benefit of U.S. provisional application No. 60/040,096, filed on Mar. 7, 1997.

FIELD OF THE INVENTION

The present invention is related to a disposable system for making and consuming a brewed beverage such as coffee or tea, without the need for a separate brewing device and, in particular, to a new system which improves the brewing process by allowing the maximum flavor to be extracted from the beverage material.

BACKGROUND OF THE INVENTION

As the consumption of fresh-brewed coffee and teas has increased in the recent past, so has the public's demand for the highest quality coffee and tea available. Consequently, awareness of the availability of gourmet coffee and tea has gone from mere acceptance to outright demand. Whether at home, in a restaurant, or at a specialty beverage store, the public has come to expect quality beverages, in whatever flavor desired, made quickly and using the freshest possible ingredients. Moreover, the availability of many different varieties of gourmet beverages, such as various coffee beans, flavored coffee roasts, imported teas, etc., has resulted in establishments such as takeout restaurants receiving many simultaneous requests for single cups of differing beverages and flavors.

In modern times, consumers often demand portability and disposability for their beverages and containers because they often are too busy to sit down and relax over their beverage. In addition, the increasingly hectic consumer lifestyle dictates that some consumers, rather than waiting for custom beverages to be ordered and prepared, would rather save time by carrying their beverages with them as the beverages brewed. The other alternative for the consumer has been to consume pre-prepared bulk beverage, such as the coffee available at fast-food drive-throughs.

Responding to the demand for high-quality, rapidly-prepared beverages for all categories of users, however, presents notable disadvantages which have not been adequately addressed in prior art filters and devices. For example, it is known in the art of coffee-making to prepare hot coffee by passing water, usually at or just below boiling temperature, through coffee grounds which are prevented from passage with the water by a filter such as a permeable paper membrane. This well-known method is called drip brewing.

Traditional drip brewing devices brew an entire multi-serving pot at once and are commonplace in homes, offices, and retail stores. These devices, however, are impractical and wasteful for the beverage drinker who wants only a single serving, especially since beverages such as coffee significantly lose their flavor with time. Because beverages such as coffee have increased in price significantly in recent years, waste also is a recurring economic problem. Further, drip brewing presents Epicurean disadvantages because paper filters trap many of the coffee's oils and therefore removes some of the flavor nuances. Also, paper filters of poor quality can introduce extraneous flavors of their own.

One response in the prior art to the problem of portioning has been the development of "single cup" coffee-making machines and assemblies. Unfortunately, these prior-art methods require devices which are neither disposable nor portable during the brewing process. Therefore, each consumer must idly wait for the period between ordering the beverage and having it served. Another problem involved in brewing coffee in this manner, especially small quantities of coffee, is the difficulty in obtaining efficient extraction of the essential flavors of the coffee when the hot water mingles with the grounds.

Still another problem with the prior-art method is the fact that existing single-cup beverage filters of this type require some type of support structure to hold the entire filter within it. The problems with this are twofold: when removing the wet, limp filter from the filter support there is increased possibility of spillage of the beverage or burstage of the filter; and the necessity of the support structure to hold the filter usually renders the system neither portable nor disposable.

Because of the aforementioned problems, some beverage drinkers resort to well-known "instant" products such as tea bags, instant coffee, and coffee filter pouches. Each method presents certain disadvantages. For example, although using tea bags can result in an acceptable beverage, the consumer is limited to brands, types, and flavors of tea that are available already in the tea bag format. Tea bags usually use a lower quality tea because at present, the fine grain teas that must be used are only commercially produced from relatively low quality tea leaves. Consequently, tea bags are not a satisfactory option for consumers desiring quickly prepared and portable single portions of high quality tea (such as the type sold loosely and prepared freshly by relatively long steeping).

The steeping process is considered the best procedure for brewing coffee or loose teas. Steeping allows for the free flow of liquids and solids (tea leaves, grinds or grounds) to interact unencumbered by any material or object. The disposable beverage filter of the instant invention allows for the true process of steeping to occur in a disposable manner without the use of any additional apparatus. No other product or invention in the marketplace allows for the steeping process to occur in an individual container, while being disposable, inexpensive, and used for a take-out format.

One approach on the market, that of "self-filling tea bags" only allow for different varieties of tea to be prepared, but do not allow for the steeping method to take place. As mentioned above, proper steeping can only take place when there is a free flow of liquid and solids.

"Instant" products also do not meet the needs of all coffee drinkers. Instant coffee and filter pouches (which are not unlike tea bags, but are instead filled with a form of instant coffee), although convenient, disposable, and portable, produce an inferior and far less flavorful cup of coffee than that made by more traditional brewing methods, such as drip-brewing and steeping. The inferior results occur because instant coffee that is submerged in boiling water or combined with boiling water does not allow water to come into free contact with coffee grains. Water-grain contact is necessary to allow the free flow of water to combine unencumbered among the coffee grains to maximize the essential oils and flavors into the beverage. Instant products simply do not have this feature and will not satisfy all beverage drinkers. Further, because of the inherent limitations in the coffee pouch format, high quality roasts of the best coffees (i.e., arabica) are not available.

Individual brewing devices that mount directly on a receiving receptacle have been developed. For example, in U.S. Pat. No, 4, 619,830 a device is disclosed that uses a filter suspended on a rod, where the filter can hang within a cup. This device is inherently unstable in that the filter bag is supported in just two places over the rod. In addition, the placement of the rod on top of and overhanging the edges of a cup means that a user cannot put a lid on the cup. Consequently, this method does not preserve the temperature of the liquid. In addition, the great possibility of spillage and tipping over mean that this invention is not truly portable.

Another prior art device is a coffee cone, disclosed in U.S. Pat. No. 5,424,083. The cone comes pre-packaged with beverage material located within the pouch. Hence, the user does not have true flexibility in selecting the freshest or most preferred product. This method, like tea bags and microwavable coffee pouches, limits the user to what varieties of products are commercially pre-packaged. In addition, since this device has a conical shape with a fixed rim, it is not adaptable to many different shapes of beverage containers. The flanges present on this invention also limit the ability of the user to cover the coffee cone during brewing. Possibility of spillage and/or loss in beverage temperature is thus increased.

It is impractical and wasteful to accommodate simultaneously consumer demands for freshness, disposability, high quality, and efficiency using present filters or beverage making devices. Each of the apparatuses and articles of manufacture of the disclosures above, as well as well as articles of manufacture and apparatuses generally known in the art, suffer on or more of several defective characteristics which ultimately detract from brewing performance, efficiency, and/or high quality results of the apparatus or article of manufacture.

SUMMARY OF THE INVENTION

The invention provides a portable, disposable, economical filter unit that can be easily handled, without messiness or unwanted temperature changes, to make a fresh brewed beverage, such as coffee, tea, or other beverage. The invention is simply connected to the upper edge of the beverage container, a desired quantity of undissolved beverage material is placed within it, and liquid such as hot water is poured into it. The liquid and solid contents flow freely within the filter body, unobstructed by paper or filters such that a steeping occurs which enhances the flavor of the brewed beverage.

If given the choice, most connoisseurs utilize the "French Press" method of coffee brewing to unlock the pure, natural flavor of high quality coffee. The French Press method basically allows the coffee grinds and the water to freely mix in a container, and after a few minutes of the steeping process, a sieve is moved through the container to press the grounds to the bottom of the container, leaving only the beverage. The method is superior because water is allowed to freely circulate around the coffee ground over a maximum possible surface area. This allows the release of the essential flavor oils of the grinds, without over-extraction, which can cause bitterness. In a drip-grind arrangement, the hot water drips down onto the grinds which are in a fixed orientation, thus the maximum surface area of the grinds are not exposed to hot water. The brew resulting from the French Press method is thick and rich. The instant invention allows as close an approximation of the French Press method as is possible in a portable and disposable container.

One embodiment of the present invention is adapted for use with a container having an opening with an edge along the opening, and includes a filter bag having a top perimeter edge portion and a body portion. The filter bag is made from a flexible porous material, such as is used in conventional coffee filters, and is formed so that the body portion of the filter bag is disposed within the beverage container. A flexible band is situated within the top perimeter edge portion of the filter bag to secure the body of the filter bag to the edge of the opening of the container. The invention advantageously provides for the solids to be isolated from the walls and the opening of the container.

In another embodiment of the above invention, the top perimeter edge portion of the filter has an opening whereby the flexible band can be grasped to secure the filter to the container and remove the filter from the container. The filter bag may also be provided with a removal string proximate the perimeter.

In another embodiment of the above invention, the flexible band comprises a drawstring which is threaded about and slidable relative to the top perimeter edge portion of the filter bag. This drawstring protruded from the top perimeter edge portion to form a means for pulling to couple and uncouple the top perimeter edge portion of the filter from the edge of the container opening.

In still another embodiment of the present invention, the filter bag is adapted to mate to the edge of a container having an opening with an edge defined along it. This embodiment includes a filter having a non-porous top portion having an outer edge mated to the opening of the container and an inner edge with an opening defined therein. A filter bag having an upper edge and a body portion is fixedly attached to the inner edge of the opening of the non-permeable top portion. The filter bag is made from a flexible porous material, such as is used in conventional coffee filters, and is formed so that the body portion of the filter bag is disposed within the beverage container. By coupling the non-porous top portion of the filter to the edge of the container opening, the filter bag is securely attached to the container for use in brewing and can be removed by uncoupling the filter from the edge of the container opening.

In any of the embodiments, the filter bag can be of the form of a pre-formed relatively rigid basket, container or cup made of filter material. Other materials may also be employed, such as various papers, porous materials, meshes, screens, or any other material which will allow liquid to diffuse freely through while substantially retaining solids.

It is an object of the present invention to provide and article of manufacture and a method of preparing coffee in a disposable manner which provides a novel method of making a beverage which exceeds the advantages of methods such as the drip-type method of making coffee, and also provides steeping features which exceed those of articles such as tea-bags.

It is a further object of this invention to provide a portable, disposable apparatus for brewing beverages that can produce a single cup of beverage which possesses quality, taste, and flavor equivalent to or better than that found in multi-cup brewing devices. Since the invention permits the hot liquid to drip through and steep with the beverage material in the filter, the full flavor of the beverage is extracted from the beverage material into the liquid in the container. Moreover, portions as small as desired can be prepared with no waste.

It is another object of this invention to provide a portable, disposable device for brewing beverages which may be used in conjunction with varying sizes of beverage containers. Because of the flexible band featured in one embodiment of the invention, the invention can be securely attached to containers having different opening sizes It is yet another object of the invention to provide a method of making a fresh cup of a beverage such as coffee or tea, where the method can uses a portable, disposable brewing apparatus as described herein.

It is yet another object of the invention to obtain a high-quality beverage by allowing grounds to remain in hot water, allowing them to release more oils and essences of the natural coffee than is possible through drip-brewing.

BRIEF DESCRIPTION OF THE DRAWINGS

The foregoing and other features and advantages of the present invention will be more fully understood from the following detailed description of an illustrative embodiment, taken in conjunction with the accompanying drawing in which:

FIG. 10 is a cut-away side view of a fourth embodiment of the invention, with a non-porous top coupled to the edge of the container opening and the body of the filter cup disposed within the container.

FIG. 11 is a cut-away side view of a fifth embodiment of the invention, with a non-porous top having supporting legs and the body of the filter disposed within the legs.

FIG. 12 is a plan view of the embodiment depicted in FIG. 11 without the filter body.

FIG. 15 is a perspective view of a seventh embodiment of the invention.

FIG. 16 is a cut-away side view of the embodiment depicted in FIG. 15 showing the filter within a container.

FIG. 17 is a perspective view of an alternative embodiment of the embodiment depicted in FIG. 15 disposed within a container.

FIG. 18 is a plan view of the alternative embodiment of the embodiment depicted in FIG. 15.

DESCRIPTION OF THE PREFERRED EMBODIMENT

Figure 1:
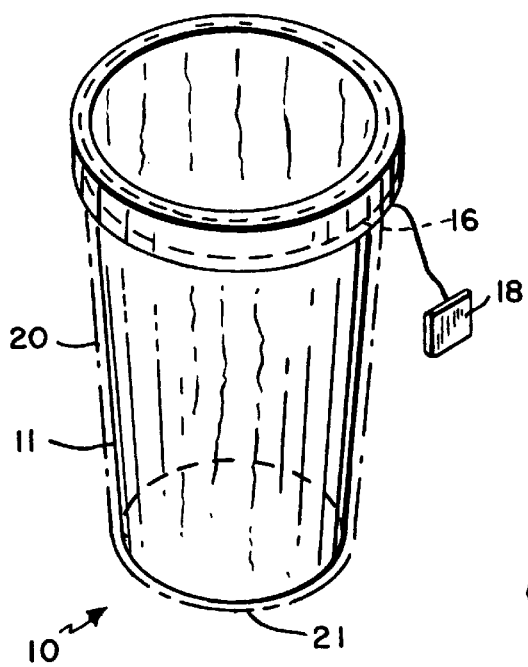
FIG. 1 is a perspective view of a first embodiment of the instant invention using a flexible band.

FIG. 1 illustrates a perspective view of a first embodiment of the instant invention. A first embodiment of the invention 10 has a top perimeter edge portion 12 and a filter body portion 14. The filter body portion 14 may be made from a flexible porous material, such as is used in conventional coffee filters or tea bags, which allows liquids with dissolved solids, but not dissolved solids, to pass through the bag. Disposed within the top perimeter edge portion 12 is a flexible band 16 and optionally a removal cord 18. The flexible band may be made from an elastic, a drawstring, or any other means suitable for being manipulated from a drawn to undrawn state and back. As FIG. 1 illustrates, the filter body portion 14 is disposed within the container 20 such that the filter body portion 14 will remain in contact with liquids that have passed through it. Optionally, the filter body portion 14 may extend to the bottom 21 of the container.

Figure 2:
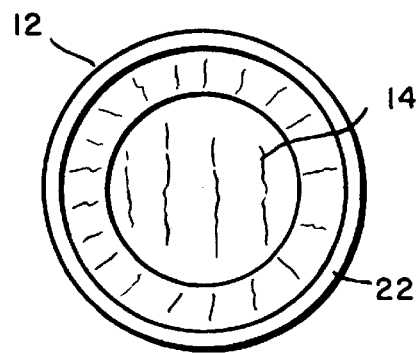
FIG. 2 is a plan view of the embodiment depicted in FIG. 1.

FIG. 2 illustrates a plan view of the first embodiment of the invention 11, showing the perimeter edge portion 12 as it would be extended about the edge 22 of the opening of container 20. The filter body portion 14 is visible as is hangs down into the container 20. Coffee, tea, or other undissolved beverage material is placed into the filter bag 14 prior to adding a liquid such as hot water.

Figure 3:
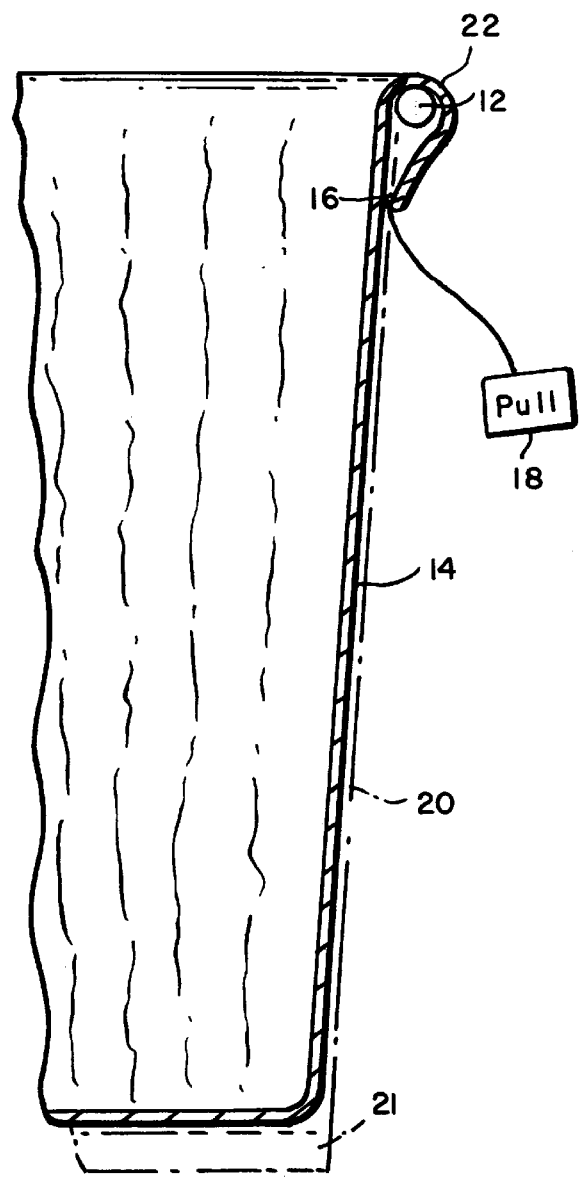
FIG. 3 is a cut-away side view of the embodiment depicted in FIG. 1, showing the band coupled to the container.

FIG. 3 illustrates a cut-away side view of the first embodiment of the invention 10. The perimeter edge portion 12 is shown coupled to the edge of the container 20 by means of the flexible band 16. In this embodiment the perimeter edge portion 12 is folded over the edge of the container 20, so that the flexible band 16 disposed within the perimeter edge portion can form a secure connection to the container 20. Because the perimeter edge portion 12 fits closely to the edge 22 of the opening of container 20, it is possible to place a cover (not shown) over the edge 22 if the opening of the container 20. The cover should be adapted to mate reasonably closely to the contours of the edge 22.

Figure 4:
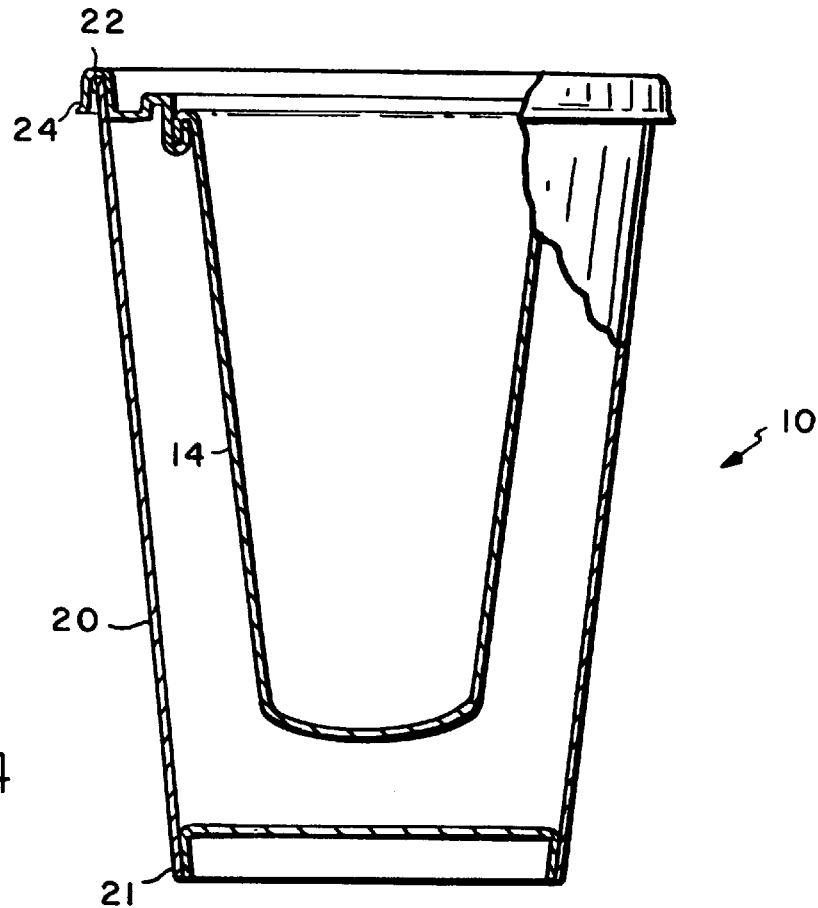
FIG. 4 is a cut-away side view of a second embodiment of the invention, with a non-porous top coupled to the edge of the container opening and the body of the filter bag disposed within the container.

FIG. 4 illustrates a cut-away side view of a second embodiment of the invention 10. This embodiment comprises a non-porous filter retainer ring 24 which forms the top of the filter. The non-porous filter retainer ring 24 preferably is rigid so that it may couple to the edge 22 of a container 20 and support the filter bag 14 when it is filled with saturated beverage material. Preferably, the non-porous filter retainer ring 24 is made of a material such as plastic. The non-porous filter retainer ring 24 is secured to a filter bag 14, which may be made from a flexible porous material, such as is used in conventional coffee filters or tea bags, which allows beverage, but not solids, to pass through the bag. The filter bag is shaped to be disposed within the container 20 such that the filter body portion 14 will remain in contact with liquids that have passed through it.

Figure 5:
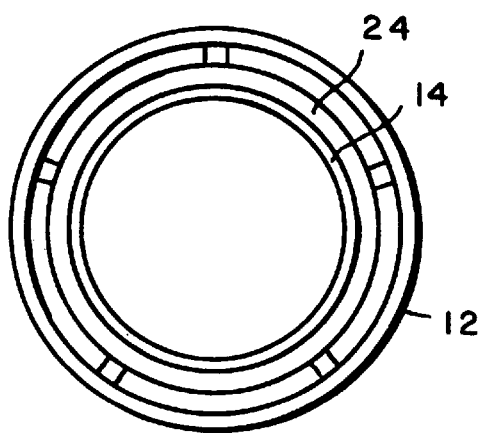
FIG. 5 is a plan view of a second embodiment of the invention having a non-porous top portion which mates to the edge of the container opening.

FIG. 5 illustrates a plan view of the second embodiment of the invention 10 illustrated in FIG. 4. FIG. 5 shows the filter retainer ring 24 with the filter body 14 secured to the inner side 26 of the filter retainer ring 24.

Figure 6:
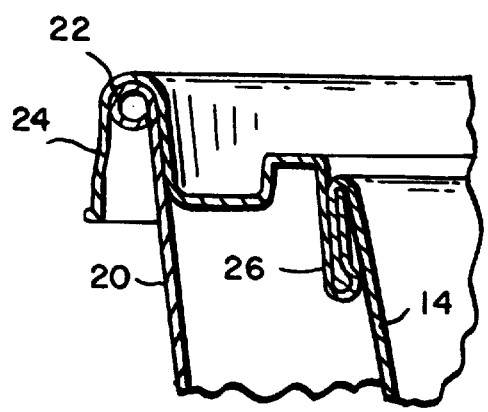
FIG. 6 is a close-up of the circled region B depicted in FIG. 4, with the filter body sealed onto the non-porous filter top.

FIG. 6 illustrates a close-up view of the circled region B of the second embodiment of the invention 10 depicted in FIG. 4. It can be seen that filter retaining ring 24 mates to the edge 22 of the opening of container 20, such that a secure, stable connection is formed to allow the filter body 14 to hang within the container 20. The filter body 14 is secured to the filter-retaining ring 24 along the inner side 26. Filter retaining ring 24 can be coupled and uncoupled from the edge 22 of the container 20 quickly and easily. In addition, it is possible to add a cover (not shown) to the combination 10 provided that the cover is adapted to mate with the retaining ring 24 and the edge 22.

Figure 7:
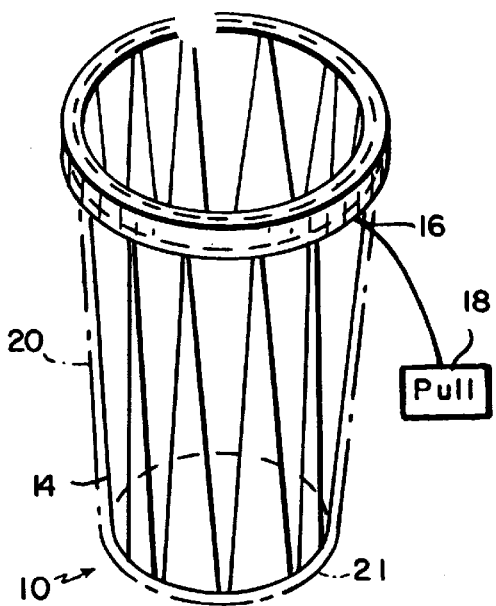
FIG. 7 is a perspective view of a third embodiment of the instant invention using a cup of filter material.

FIG. 7 illustrates a perspective view of a third embodiment of the instant invention. A third embodiment of the invention 10 has a top perimeter edge portion 12 and a filter body portion 14. The filter body portion 14 may be made from a preformed, relatively rigid-walled cup made of conventional filter material, which allows liquids with dissolved solids, but not dissolved solids, to pass through the filter body. Disposed within the top perimeter edge portion 12 is a flexible band 16 and optionally a removal cord 18. The flexible band may be made from an elastic, a drawstring, or any other means suitable for being manipulated from a drawn to undrawn state and back. As FIG. 7 illustrates, the filter body portion 14 is disposed within the container 20 such that the filter body portion 14 will remain in contact with liquids that have passed through it. Optionally, the filter body portion 14 may extend to the bottom 21 of the container.

Figure 8:
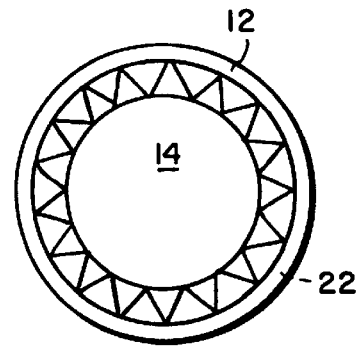
FIG. 8 is a plan view of the embodiment depicted in FIG. 7.

FIG. 8 illustrates a plan view of the third embodiment of the invention 11, showing the perimeter edge portion 12 as it would be extended about the edge 22 of the opening of container 20. The filter body portion 14 is visible as is hangs down into the container 20. Coffee, tea, or other undissolved beverage material is placed into the filter body 14 prior to adding a liquid such as hot water.

Figure 9:
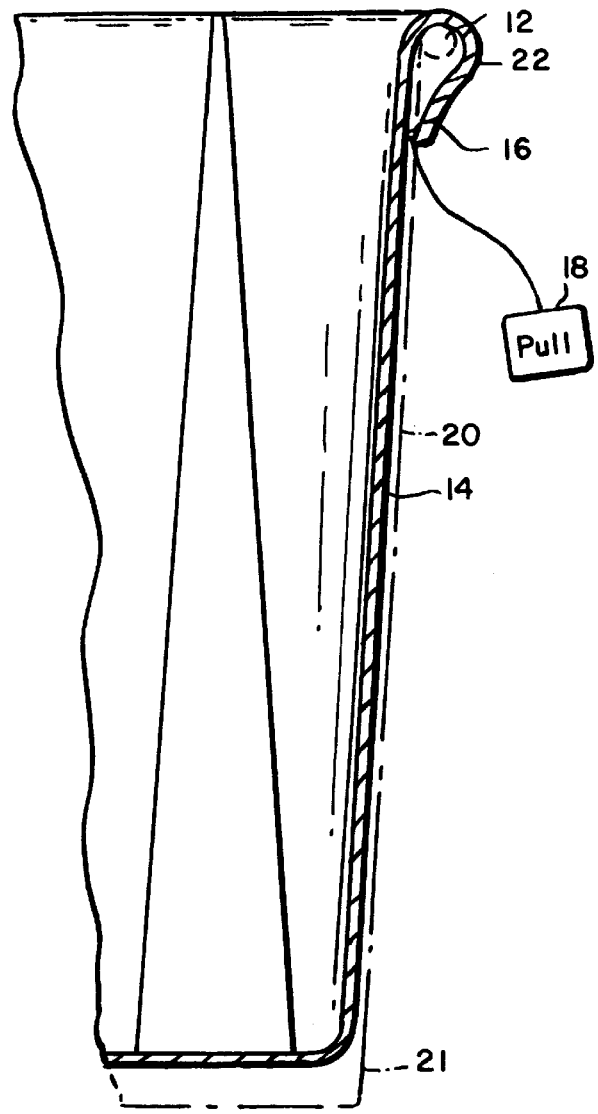
FIG. 9 is a cut-away side view of the embodiment depicted in FIG. 7, showing the filter coupled to the container.

FIG. 9 illustrates a cut-away side view of the first embodiment of the invention 10. The perimeter edge portion 12 is shown coupled to the edge of the container 20 by means of the flexible band 16. In this embodiment the perimeter edge portion 12 is folded over the edge of the container 20, so that the flexible band 16 disposed within the perimeter edge portion can form a secure connection to the container 20. Because the perimeter edge portion 12 fits closely to the edge 22 of the opening of container 20, it is possible to place a cover (not shown) over the edge 22 if the opening of the container 20. The cover should be adapted to mate reasonably closely to the contours of the edge 22.

FIG. 10 illustrates a cut-away side view of a fourth embodiment of the invention 10. This embodiment comprises a non-porous filter retainer ring 24 which forms the top of the filter. The non-porous filter retainer ring 24 preferably is rigid so that it may couple to the edge 22 of a container 20 and support the filter body 14 when it is filled with saturated beverage material. Preferably, the non-porous filter retainer ring 24 is made of a material such as plastic. The non-porous filter retainer ring 24 is secured to a filter body 14, which may be made from a preformed, relatively rigid-walled cup made of conventional filter material, which allows beverage, but not solids, to pass through the bag. The filter body is shaped to be disposed within the container 20 such that the filter body portion 14 will remain in contact with liquids that have passed through it. FIGS. 5 and 6, pertaining to the second embodiment, substantially apply to the fourth embodiment as well.

Referring now to FIGS. 11 and 12, an arrangement similar to the second and fourth embodiments is depicted. In this fifth embodiment, it can be seen that filter retaining ring 24 mates to the edge 22 of the opening of container 20, such that a secure, stable connection is formed to allow the filter body 14 to hang within the container 20. The filter body 14 is secured to the filter-retaining ring 24 along the inner side 26. The inner side 26 extends downwards to form legs 28. As seen in FIG. 12, the legs terminate at a bottom member in the form of annulus 30 surrounding a hole 32. When the filter is inserted, the legs 28 and the bottom member 30 form a basket supporting the filter. This embodiment provides extra strength to the filter, and helps support the weight of the wet grounds when the ring 24 is removed from the container 20. Filter retaining ring 24 can be coupled and uncoupled from the edge 22 of the container 20 quickly and easily. In addition, it is possible to add a cover (not shown) adapted to mate with the retaining ring 24 or the edge 22.

Figure 13:
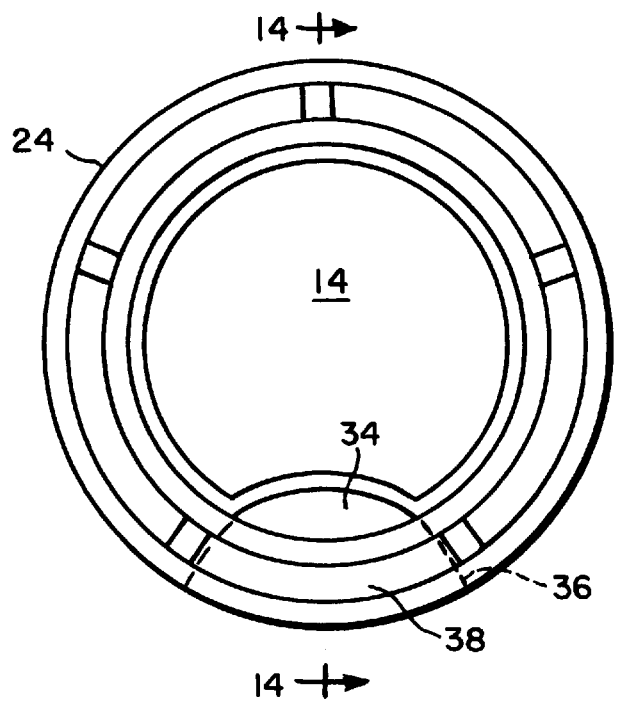
FIG. 13 is a plan view of a sixth embodiment of the invention.

A sixth embodiment is depicted in FIG. 13, which is similar to the second, fourth and fifth embodiments. A retaining ring 24 is provided with an opening 34, allowing beverage to be drunk without removing the filter retaining ring 24 or the filter 14. The retaining ring 24 may optionally have break lines 36, such as perforations or scoring, for removing the retaining ring portion 38 surrounding the opening 34. Of course, the retaining ring portion 38 may be initially formed to cover the opening, and a user may remove it via, for example, a pull-tab. In addition, it is possible to add a cover (not shown) adapted to mate with the retaining ring 24 or the edge 22.

Figure 14:
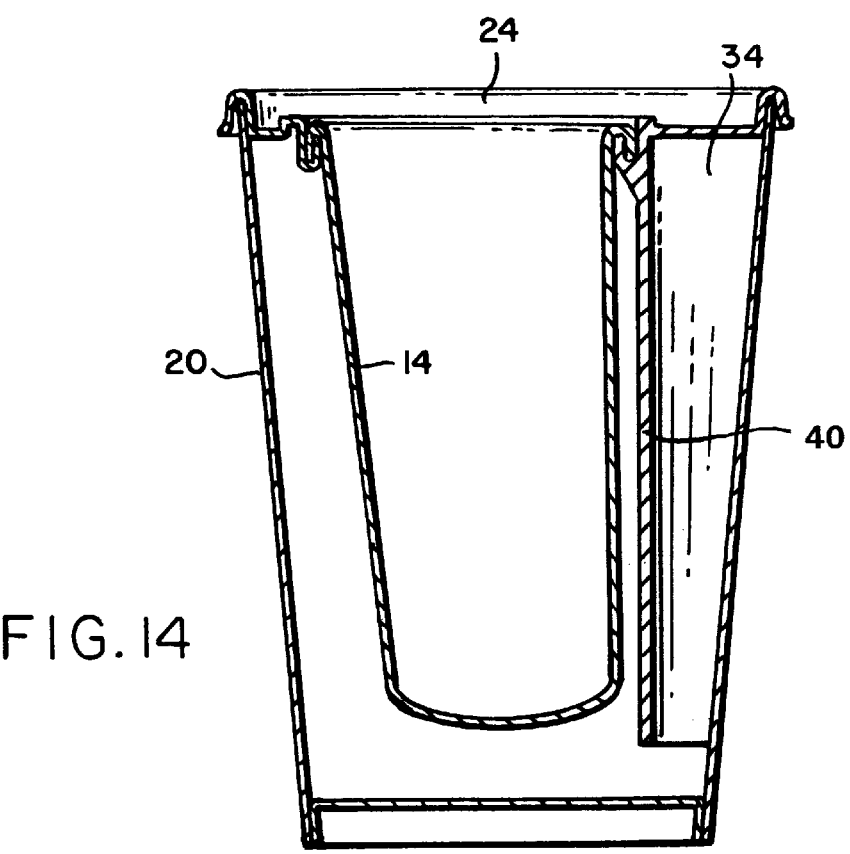
FIG. 14 is a cut-away side view of the embodiment depicted in FIG. 13.

FIG. 14 depicts a side view of the embodiment of FIG. 13, showing the opening 34 positioned atop a channel 40 which descends into the container 20. Advantageously, the channel 40 prevents the filter body 14 from occluding the flow of beverage to the opening when the container 20 is tipped, should it be desired to drink the beverage with the filter itl situ. The channel may be of any practical size and shape to allow the free flow of beverage to the opening. The channel walls may also be perforated. A cover (not shown) may be placed over the assembly depicted with an opening corresponding to the opening 34. It is also noted that the channel may be used with in conjunction with the embodiment depicted in FIGS. 11 and 12 as well. The channel 38 can join in such a combination with annulus 30, or coextend with one of the legs 28. It is also foreseen that the channel wall might extend upwardly of the retainer member 24 for situations where a cover (not shown) is to be provided which provides added volume above the container mouth, such as for beverages including steamed milk froth, and the like.

A seventh embodiment is depicted in FIG. 15. In this embodiment the disposable filter assembly 40 is preferable made as one integral unit from a material which allows a liquid to pass through and maintain contact with the solid beverage material within the filter body 42. This material can be a permeable paper formed to the desired dimensions or can be a plastic having a series of small holes therein as illustrated in FIG. 18. Preferably, the holes are of a size to allow water to pass through and contact the solid beverage material within the filter body but not allow the solid beverage material to escape. The filter body 40 has an upper perimeter edge 44 with an opening defined therein 46. The filter body 42 when disposed within a container having an opening 20, as shown in FIGS. 16 and 17 forms a channel 48 with the container wall 58 extending from the container opening 50 downward into the container. The channel 48 prevents the filter body 42 from occluding the flow of liquid beverage to the container opening when the container is tipped, should it be desired to drink the beverage with the filter in situ. The channel may be of any practical size and shape to allow the free flow of beverage to the opening.

In one embodiment (FIG. 16), the filter body 42 is formed to meet the inner dimensions of the container 20. In this embodiment, the filter body can either sit on the bottom of the container or have a snug friction fit with the wall of the container and thus there is no need to secure the upper perimeter edge 44 to the container opening.

In an alternative embodiment, illustrated in FIGS. 17 and 18, the upper perimeter edge of the filter body is formed as a lip 52 that rest upon the edge of the container opening 60 and supports the assembly in the container.

Additionally, in both embodiments, it is possible to add a cover (not shown) adapted to mate with the edge of the container opening 60 and/or lip 52.

In the seventh embodiments, the upper perimeter edge of the filter body can be formed with a tab 54 for removing the assembly from the container. The tab 54 may be formed with a finger hole 56 to assisted the user in gripping the assembly when removing it from the container. The tab 54 is preferably formed of a flexible material, e.g., paper or plastic, allowing it to be pushed down when a cover is placed upon the container.

Additionally, in this embodiment, the upper perimeter edge of the filter body can form a wall 58 extending above the channel that forms a seal with a cover, e.g., a conventional dome cover, placed on the container and prevents solid beverage material from pouring into the channel with the container is tipped.

Figure 19:
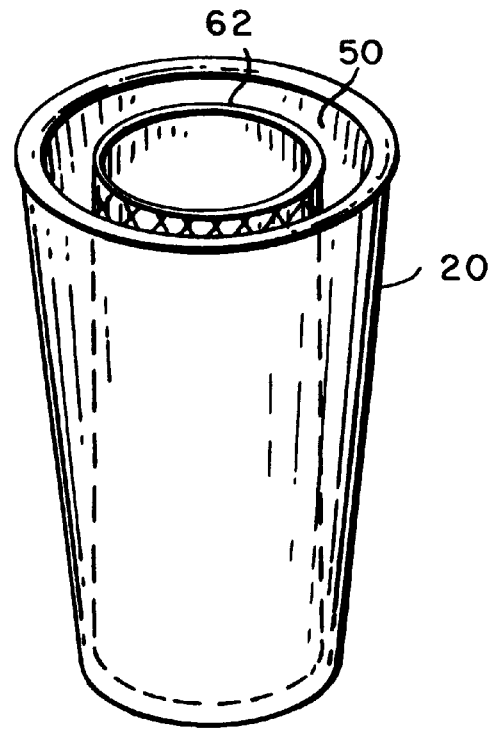
FIG. 19 is a perspective view of an alternative embodiment of the invention.
Figure 20:
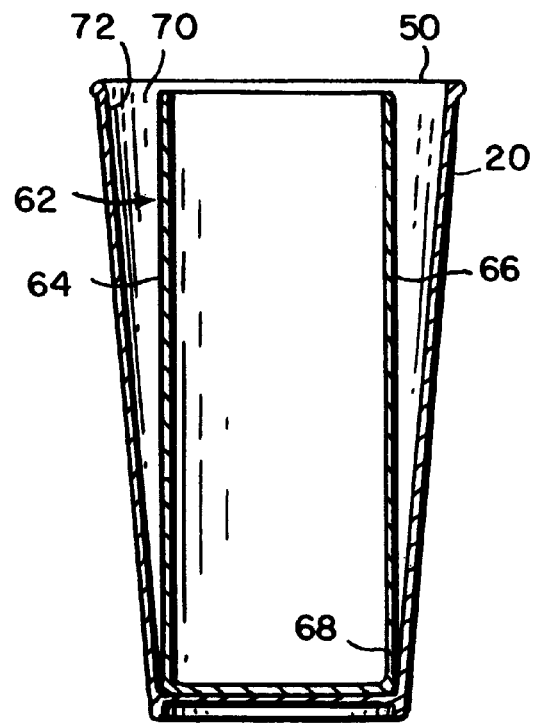
FIG. 20 is a cut-away side view of the embodiment depicted in FIG. 19 showing the filter within a container.

In a further alternative embodiment illustrated in FIGS. 19 and 20, the disposable filter assembly 62 has a filter body 64 having an upper 64 and lower portion 68. The lower portion 68 is formed to meet the inner dimensions of the container and when inserted into a container is secured therein with a snug friction fit. When the filter body is disposed within a container having an opening 20, as shown in FIGS. 19 and 20, the upper portion 64 forms a channel 70 with the container wall 72 extending from the container opening 50 downward into the container, and, in preferred embodiments, around the filter body. The channel 70 prevents the filter body 64 from occluding the flow of liquid beverage to the container opening when the container 20 is tipped, should it be desired to drink the beverage with the filter it situ. The channel may be of any practical size and shape to allow the free flow of beverage to the opening.

Referring to all the aforementioned embodiments, a common method of beverage preparation can be used. The following description will refer specifically to the second embodiment of the instant invention, but should apply equally to the other embodiments. To make a portion of beverage, such as coffee, the filter retainer ring 24 is secured about the edge of the container 20. Next, the filter body 14 is filled with enough beverage material suitable for the portion size. For example, to make a cup of coffee the filter body 14 should contain about six to eight level teaspoons of ground coffee. Although a coarse grind is preferred, the grind of the coffee used is not critical because the steeping step helps to extract maximum flavor from all types of grounds, even those, such as regular grind, in which the water passes rapidly through the grounds.

Next, hot water Oust below boiling temperature, typically 195° to 210° Fahrenheit) is poured into the filter body 14, in a quantity corresponding to the amount of beverage material in the filter and the strength of beverage desired. This continuous pouring of water into filter body 14 agitates the beverage material, allowing water to contact the maximum possible surface area and extract the most possible flavor from the grounds. (This beneficial feature is not as possible, for instance, with conventional drip-brewing coffee makers where a quantity of coffee grounds sits near the bottom of a relatively large filter.)

When the desired level of liquid poured in and has flown through the beverage material and the filter body 14 into the beverage container 20, the steeping process begins. At this point a cover (not shown) may be placed onto the retaining ring 24, if the user desires to move the container and/or maintain the temperature of the liquid. During steeping, the wet beverage material remaining in the filter body 14 remains in contact with the liquid in the beverage container 20 because the filter body 14 hangs down well into the liquid in the beverage container 20. The filter body 14 can also line the interior walls and/or bottom of the container.

Following the beverage preparation process, the user can cleanly and easily remove and dispose of the invention 10 containing wet beverage material. In the first embodiment as shown in FIG. 1, the user grabs the edge of the filter by portion containing the elastic band 16 or removal cord 18, to remove the filter body 14 from the liquid in the container 20 and seal up the filter body 14.

In the embodiment shown in FIG. 4, the user can uncouple the filter retainer ring 24 from the edge 22 of the beverage container 20 and dispose of the entire assembly.

Although, as described above, the filters might be sold with beverage material already contained in them, it is preferable to provide the filters empty so that the consumer can supply separately the freshest possible beverage material. In addition, since the bag-type filters are highly compressible, storage should take up no more space than storing typical coffee filters or typical disposable beverage covers. The rigid-walled filters are nestably stackable.

Since individual portions of beverages can be made in a simple, fast, convenient, clean, economical, and disposable manner, with no skill and without mess, a host may offer to his guests (or a restaurateur to her patrons) their individual choices of different blends or varieties of beverages, rather than serving everyone from the same beverage container or having to prepare multiple containers of different beverages. Further, very-high-quality beverages may be provided which allow portability and individual control over steeping time.

Although the invention has been shown and described with respect to exemplary embodiments thereof, various other changes, additions and omissions in the form and detail thereof may be made therein without departing from the spirit and scope of the invention.

What is claimed is:

1. A disposable filter assembly for making a beverage from an infusible solid beverage material, comprising:

a filter body for retaining a charge of infusible solid beverage material, made from a material which allows a liquid to pass through and maintain contact with the solid beverage material within the filter body, having an upper perimeter edge with an opening defined therein and a body portion, said filter body when disposed within a container having an opening and an inner wall, forms a channel with the inner wall extending from said container opening downward into the container, such that the filter body is prevented from occluding the flow of liquid beverage to said container opening.

2. The disposable filter assembly of claim 1, wherein the upper perimeter edge of the filter body comprises a lip that rest upon an edge of the container opening.

3. The disposable filter assembly of claim 1, wherein the upper perimeter edge of the filter body comprises a tab for removing the assembly from the container.

4. The disposable filter assembly of claim 1, wherein the filter body comprises an upper and lower portion and wherein the lower portion, when inserted into a container, is secured therein with a friction fit.

* * * * *